(12) United States Patent
Sun

(10) Patent No.: US 8,733,386 B2
(45) Date of Patent: May 27, 2014

(54) DRINKING WATER FAUCET WITH AIR GAP TO DISCHARGE WASTE WATER

(75) Inventor: Tung-Hsin Sun, Taichung (TW)

(73) Assignee: Grand Advanced Technologies Co. Ltd., Taichung (TW)

( * ) Notice: Subject to any disclaimer, the term of this patent is extended or adjusted under 35 U.S.C. 154(b) by 53 days.

(21) Appl. No.: 13/543,830

(22) Filed: Jul. 8, 2012

(65) Prior Publication Data

US 2014/0007967 A1    Jan. 9, 2014

(51) Int. Cl.
*E03C 1/10*    (2006.01)
(52) U.S. Cl.
USPC .......................................... 137/216; 137/801
(58) Field of Classification Search
USPC ............... 137/215, 216, 801; 4/675–678, 696
See application file for complete search history.

(56) References Cited

U.S. PATENT DOCUMENTS

| | | | | |
|---|---|---|---|---|
| 3,620,241 A * | 11/1971 | Brown | ............................. | 137/216 |
| 3,967,638 A * | 7/1976 | Tondreau | ........................ | 137/216 |
| 5,865,209 A * | 2/1999 | Vidal | .............................. | 137/216 |
| 7,011,106 B2 * | 3/2006 | Kawolics et al. | .............. | 137/216 |
| 7,357,147 B2 * | 4/2008 | Kawolics et al. | .............. | 137/216 |
| 2011/0126932 A1 * | 6/2011 | Chan | .............................. | 137/801 |

* cited by examiner

*Primary Examiner* — Craig Schneider
(74) *Attorney, Agent, or Firm* — Che-Yang Chen; Law Office of Michael Chen

(57) ABSTRACT

A drinking water faucet capable of discharging waste water includes a main body, a valve base, a water control unit, a connecting tube and a securing nut. A receiving space that is through and downward is formed inside the main body, and a trough room and an air hole are formed at front portion of the receiving space, upper portion of which has a water outlet tube. A water outlet hole and water inlet tube are located at upper and lower portions of the valve base respectively, and a water control space and discharging portion are formed at front portion of the valve base. The reflux of waste water can be prevented to contaminate the filtering components by using the combination of the air hole, the discharging portion, a waste water import tube and a waste water export tube, so the drinking water becomes more clean and safe to drink.

6 Claims, 7 Drawing Sheets

DRINKING WATER FAUCET WITH AIR GAP TO DISCHARGE WASTE WATER

FIELD OF THE INVENTION

The present invention relates to a drinking water faucet with air gap to discharge waste water, and more particularly to a drinking water faucet structure that can prevent reflux of waste water generated in the filtering process from contaminating the filtering components.

BACKGROUND OF THE INVENTION

With the rapid development of the industry, our air, land and water have been excessively contaminated. When the waste air is discharged, it goes with the airflow to different other locations. When it rains, the waste air goes down to the ground with the rain to cause more expansive pollution to the water sources. Or when the industrial wastes are randomly discarded, they can also be taken by the rain to the water source and contaminate it. Although the water would be sent to the purification plant to undergo the processes of sedimentation, disinfection and exposure, these processes cannot eliminate all kinds of contaminants, so it may cause health problems to drink. Furthermore, most water pipes are old, and most people do not clean the water towers on a regular basis, so all kinds of contaminants can be accumulated in the water pipes and water towers, which can be considered a secondary contamination of the water. Therefore, with the concern of clean drinking water, most people filter the tap water before drinking it.

However, when the water is filtered by water filtering devices, a huge amount of waste water can be generated, and the waste water has to be discharged through the discharge tube in the sink. But if simply connecting the waste water tube to the discharge tube, it can be affected by the connected pipe principle and the reflux of waste water may occur to contaminate the filtering components. Therefore, there remains a need for a new and improved drinking water faucet to overcome the problems stated above.

SUMMARY OF THE INVENTION

To solve and overcome the problems stated above, the present invention provides a drinking water faucet having an air gap to discharge waste water including a main body, a valve base, a water control unit, a connecting tube and a securing nut. A receiving space that is through and downward is formed inside the main body, and a trough room is connected at a front portion of the receiving space. An upper portion of the receiving space has a shrinking portion to connect a water outlet tube, and an engaging rib is protrudingly formed on top of the shrinking portion of the receiving space, and an air hole of the receiving space is disposed at one side at lower portion of the trough room. A water outlet hole and a water inlet tube are located at upper and lower portions of the valve base respectively, and a water control space is formed at front portion of the valve base while a discharging portion is disposed at a recessed space. A first flow hole and a second flow hole are disposed at upper and lower portions respectively inside the water control space, and the first flow hole and the second flow hole are used to connect the water outlet hole and the water inlet tube. Also, the discharging portion has a waste import section; a waste export section; an n-shaped water tube located at upper portion of the discharging portion to connect the waste import section and waste export section; and a check air hole at upper portion of the waste export section. An engaging slot is located on top of the valve base, and the engaging slot and the engaging rib engage with each other when the valve base is inserted into the receiving space of the main body, so that the valve base can be securely positioned in terms of angle. The water control unit has a water control valve controlled by a handle, and the handle drives the water control valve to rotate, so that the water control valve can control the water (on/off) in the water control space of the valve base. Namely, it controls open/close of the first flow hole and the second flow hole. The connecting tube has an outer water inlet tube, a waste water import tube, and a waste water export tube, which are connected to a fixed plate. The securing nut has a connecting section used to lock the main body with screw. According to the structure stated above, a drinking water faucet having an air gap to discharge waste water is obtained.

Comparing with the conventional arts, the present invention is advantageous because (i) the reflux of waste water can be prevented to contaminate the filtering components by using the combination of the air hole, the discharging portion, the waste water import tube and the waste water export tube, so the drinking water becomes more clean and safe to drink; and (ii) the water inlet tube and the discharging portion on the valve base are formed as one piece, so the number of components of the faucet is reduced to be more competitive in the market.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
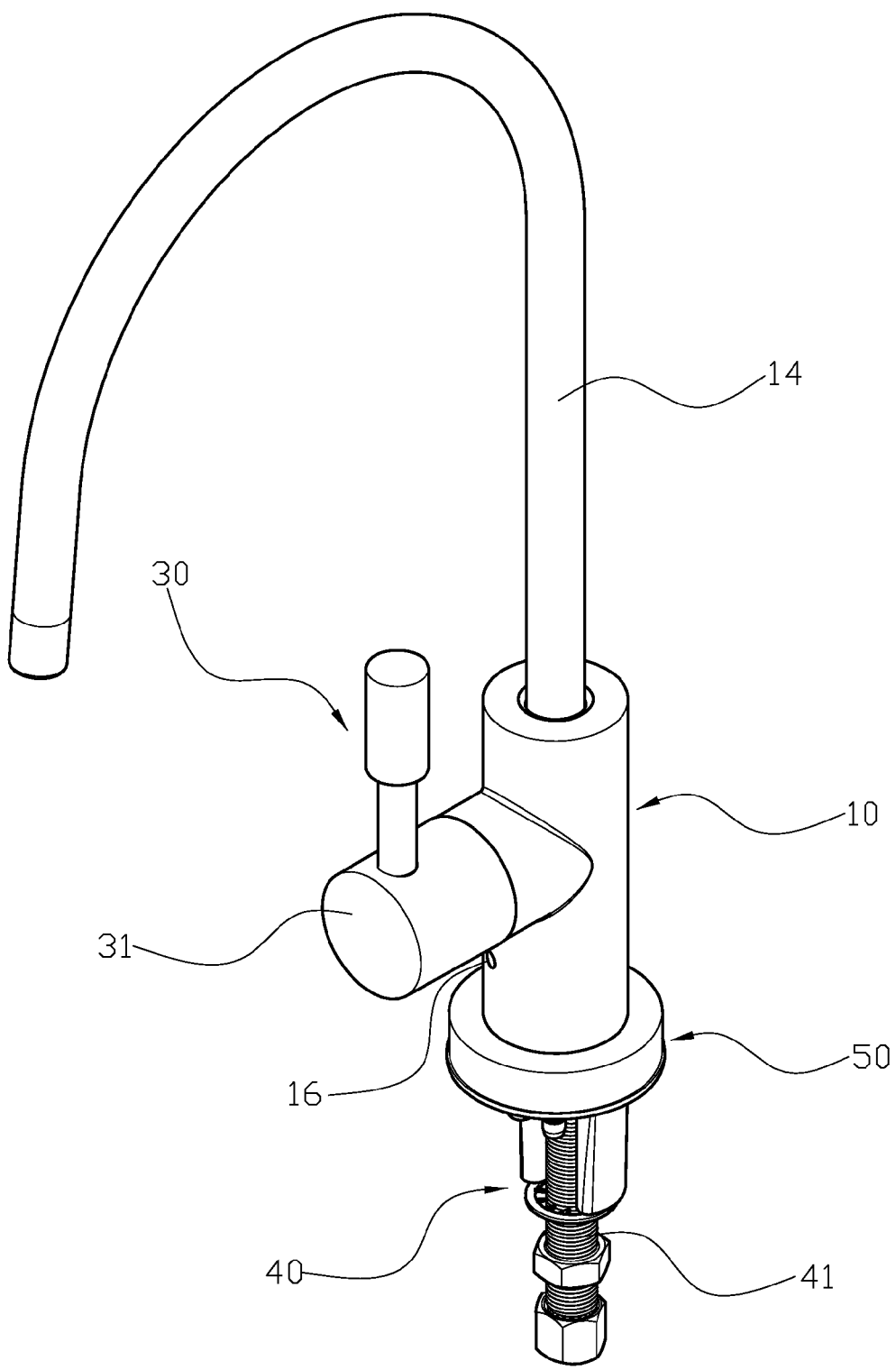
FIG. 1 illustrates a three-dimensional view in the present invention.
Figure 2:
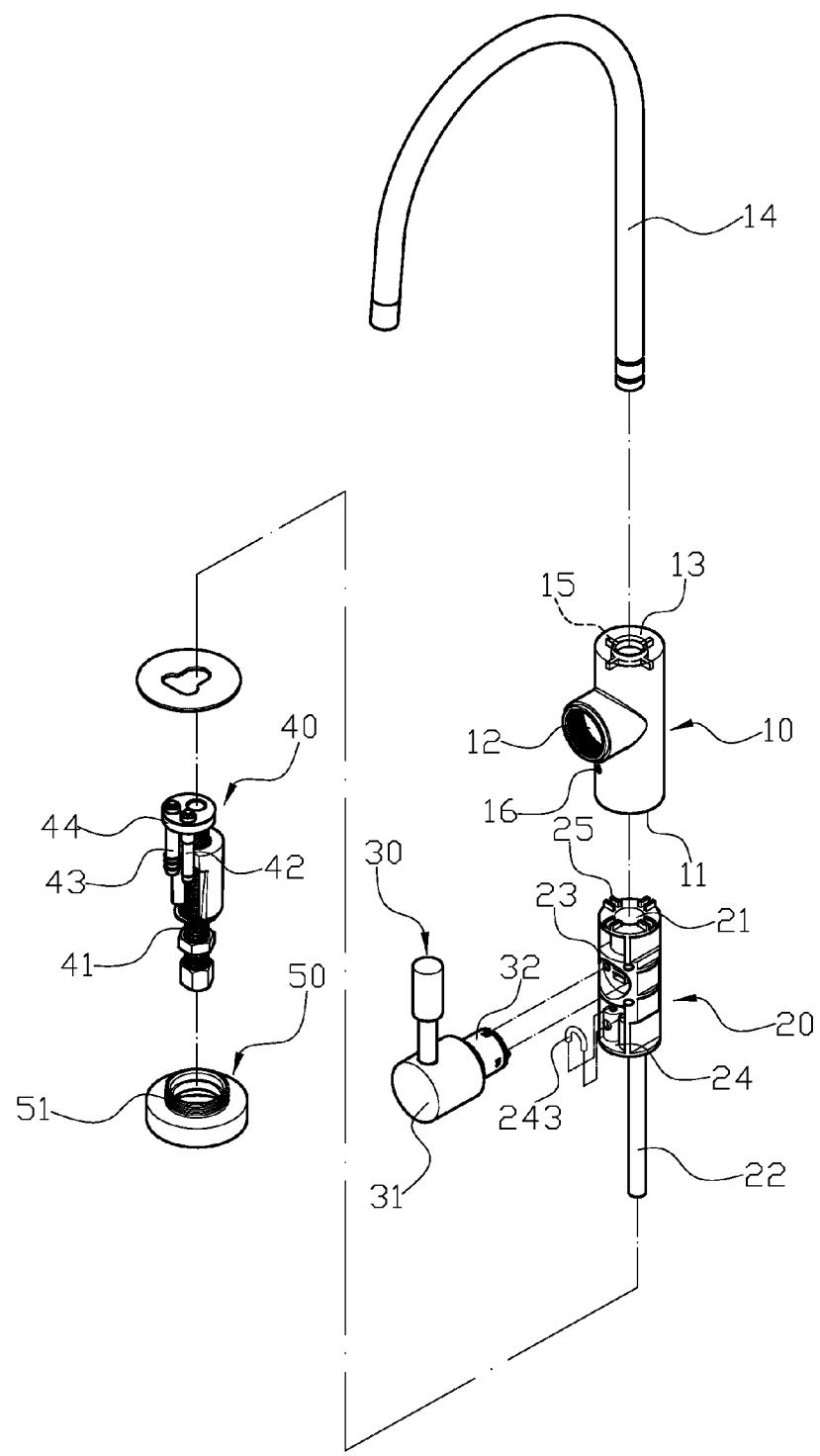
FIG. 2 illustrates a three-dimensional exploded view in the present invention.
Figure 3:
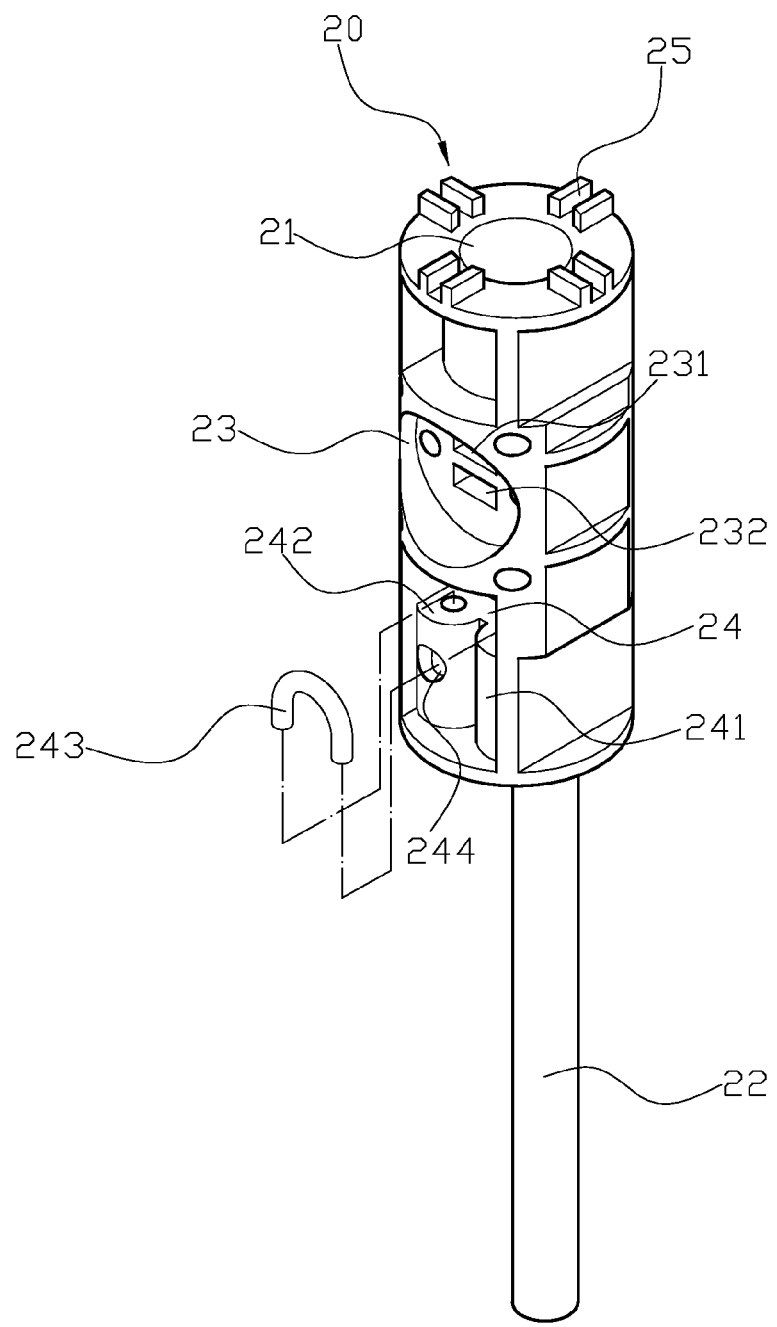
FIG. 3 illustrates an enlarged three-dimensional view of the valve base in the present invention.

In order to further understand the goal, characteristics and effect of the present invention, a number of embodiments along with the drawings are illustrated as following:

Referring to FIGS. 1 to 3, the present invention provides a drinking water faucet having an air gap to discharge waste water including a main body (10), a valve base (20), a water control unit (30), a connecting tube (40) and a securing nut (50). A receiving space (11) that is through and downward is formed inside the main body (10), and a trough room (12) is connected at a front portion of the receiving space (11). An upper portion of the receiving space has a shrinking portion (13) to connect a water outlet tube (14), and an engaging rib (15) is protrudingly formed on top of the shrinking portion (13) of the receiving space (11), and an air hole (16) of the receiving space (11) is disposed at one side at lower portion of the trough room (12). A water outlet hole (21) and a water inlet tube (22) are located at upper and lower portions of the valve base (20) respectively, and a water control space (23) is formed at front portion of the valve base while a discharging portion (24) is disposed at a recessed space. A first flow hole (231) and a second flow hole (232) are disposed at upper and lower portions respectively inside the water control space (23), and the first flow hole (231) and the second flow hole (232) are used to connect the water outlet hole (21) and the water inlet tube (22). Also, the discharging portion (24) has a waste import section (241); a waste export section (242); an n-shaped water tube (243) located at upper portion of the discharging portion (24) to connect the waste import section (241) and waste export section (242); and a check air hole (244) at upper portion of the waste export section (242). An engaging slot (25) is located on top of the valve base (20), and the engaging slot (25) and the engaging rib (15) engage with each other when the valve base (20) is inserted into the receiving space (11) of the main body (10), so that the valve base (20) can be securely positioned in terms of angle. The water control unit (30) has a water control valve (32) controlled by a handle (31), and the handle (31) drives the water control valve (32) to rotate, so that the water control valve (32) can control the water (on/off) in the water control space (23) of the valve base (20). Namely, it controls on/off of the first flow hole (231) and the second flow hole (232). The connecting tube (40) has an outer water inlet tube (41), a waste water import tube (42), and a waste water export tube (43), which are connected to a fixed plate (44). The securing nut (50) has a connecting section (51) used to lock the main body (10) with screw.

Figure 4:
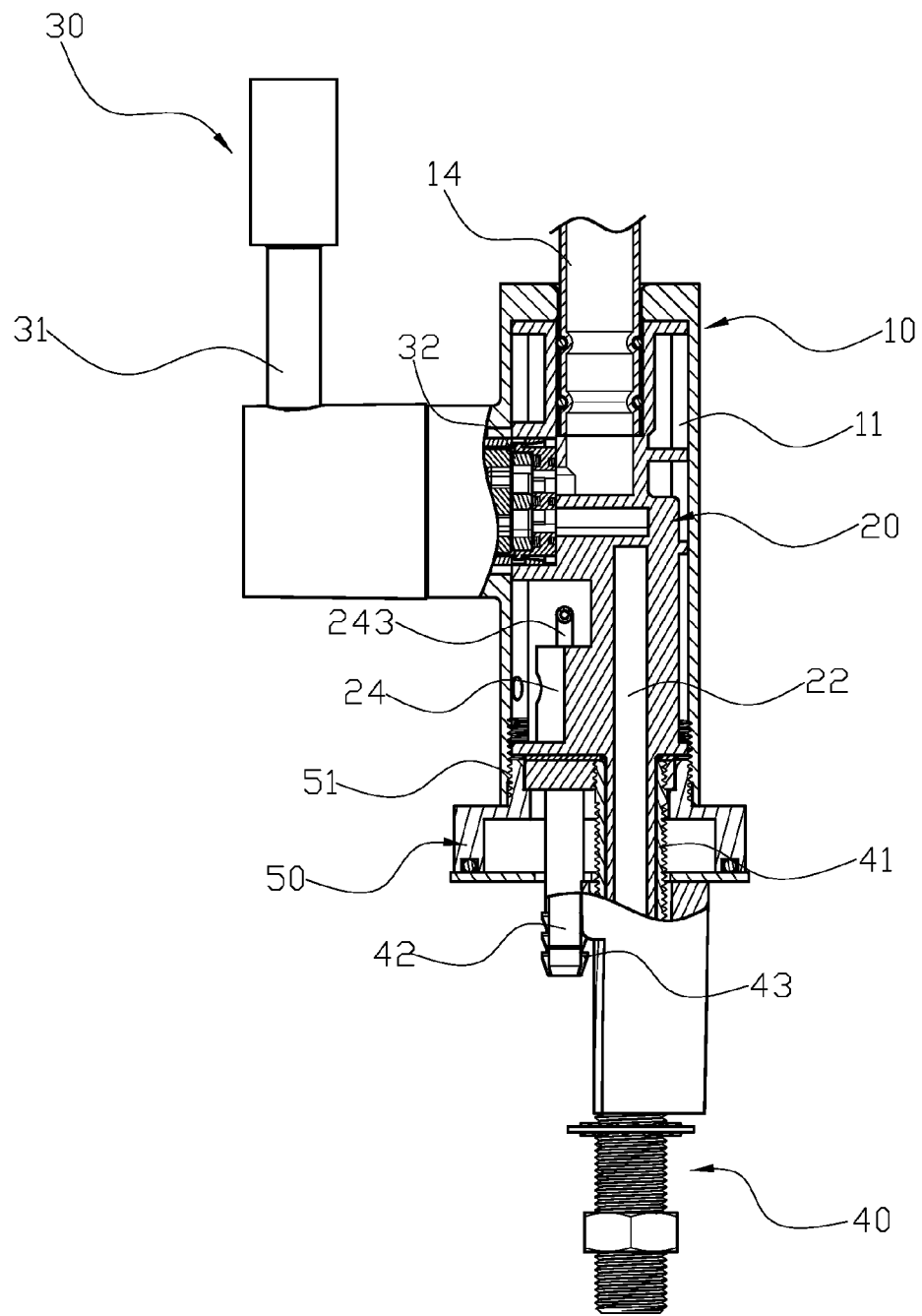
FIG. 4 illustrates a sectional view of the assembled faucet in the present invention.

Referring to FIGS. 1 and 4 for the structure of the present invention, the valve base (20) is disposed into the receiving space (11) of the main body (10), so that the water outlet hole (21) can upwardly connect to the water outlet tube (14). The water control unit (30) is installed in the trough room (12) of the main body (10), so that the water control valve (32) can fit into the water control space (23) of the valve base (20) to control the flow of the filtered water. Also, the outer water inlet tube (41) of the connecting tube (40) covers the outer portion of the water inlet tube (22) of the valve base (20), so that the fixed plate (44) is located at bottom portion of the valve base (20) to further connect the waste water import tube (42) and the waste import section (241), as well as the waste water export tube (43) and the waste export section (242). A water stopping unit is disposed between the valve base (20) and the fixed plate (44) of the connecting tube (40), and when the securing nut (50) is locked through the connecting section (51) at the bottom of the main body (10), the connecting tube (40) and the valve base (20) can be positioned to complete the assembly process of the faucet.

Figure 5:
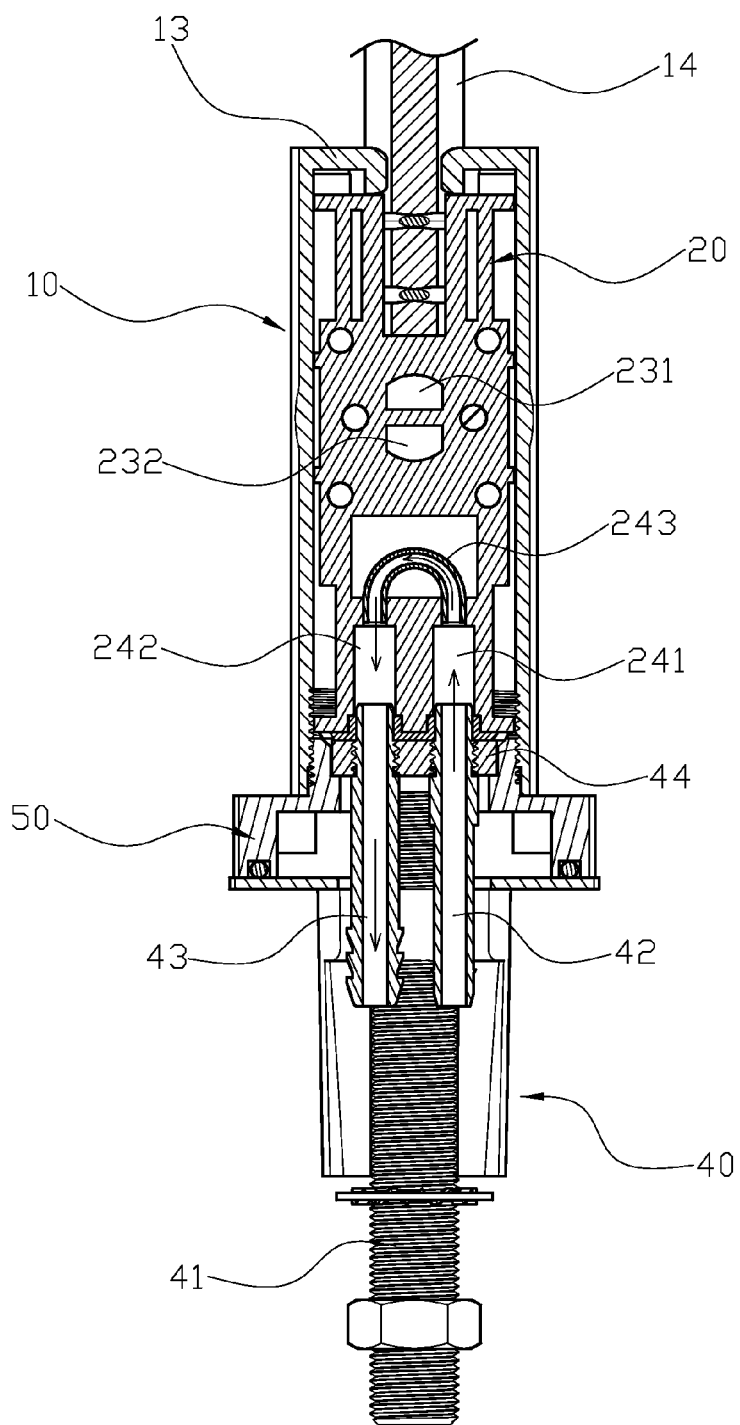
FIG. 5 illustrates a schematic view of waste water discharging in the present invention.

When in use, the faucet in the present invention is installed at a sink through the main body (10), and the outer water inlet tube (41) and the waste water import tube (42) are respectively connected to the water tube and waste water tube from the water filtering device, and the waste water export tube (43) is connected to a hose to a discharge tube of the sink. When the user wants to use water, he/she can operate the handle (31) to control the clean water flowing from the outer water inlet tube (41) through the water inlet tube (22) to the valve base (20) and flowing out from the water outlet tube (14), and the user can enjoy the clean water. In the water cleaning process, the waste water generated from the water filtering device can be discharged from the waste water import tube (42), the waste import section (241), the n-shaped water tube (243), the waste export section (242) and the waste water export tube (43) to the discharge tube in the sink (see FIG. 5) to achieve the goal of separating clean water and waste water. Furthermore, when the water filtering device stops generating water, the air from outside can enter the discharging portion (24) from the air hole (16) and the check air hole (244) to achieve the goal of air-stopping in the discharging portion (24), and enable the waste water to be discharged completely inside the waste export section (242). Meanwhile, the waste water remains in the waste import section (241) can be significantly reduced to stop reflux of the waste water. Therefore, it can prevent the filtering components from being contaminated and the drinking water would become more clean and safe to drink.

Figure 6:
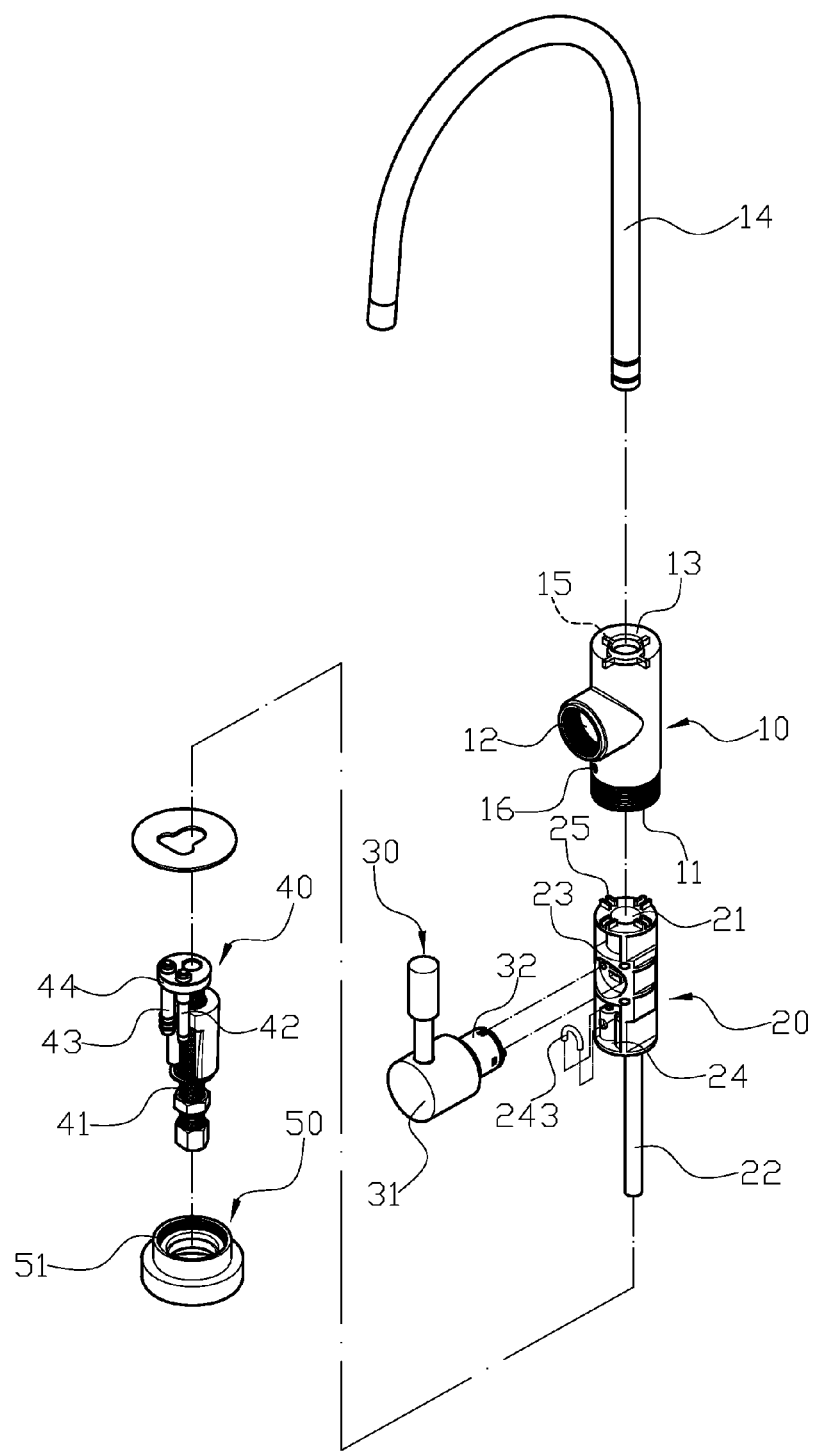
FIG. 6 illustrates a three-dimensional exploded view of another embodiment in the present invention.
Figure 7:
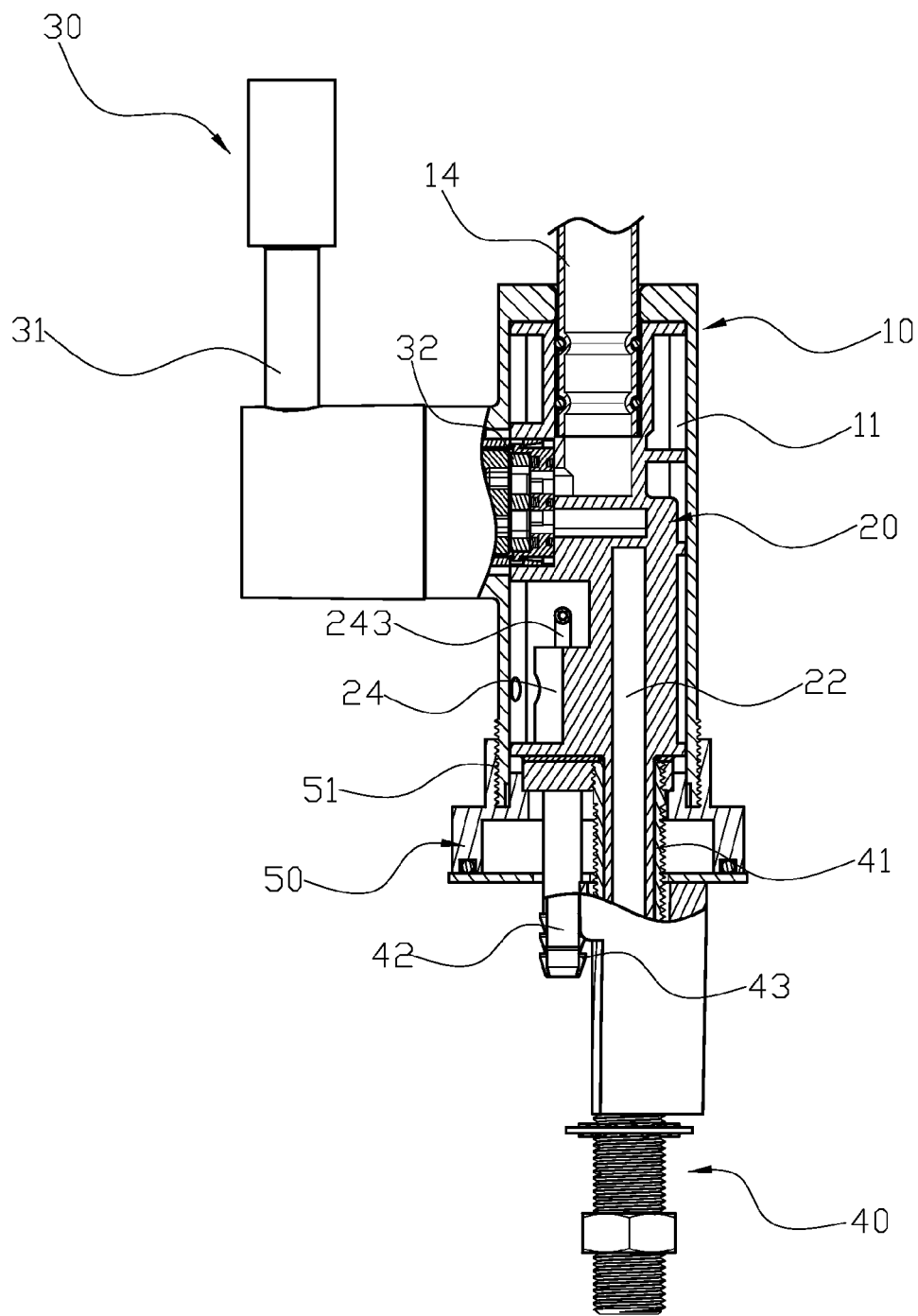
FIG. 7 illustrates a sectional view of the assembled faucet of another embodiment in the present invention.

In one embodiment, the connecting section (51) of the securing nut (50) has outer threads (see FIGS. 2 and 4), and in another embodiment, the connecting section (51) has inner threads (see FIGS. 6 and 7). The user can choose different threads according to the difference of the main body (10).

According to the embodiments discussed above, the present invention is advantageous because (i) the reflux of waste water can be prevented to contaminate the filtering components by using the combination of the air hole (16), the discharging portion (24), the waste water import tube (42) and the waste water export tube (43), so the drinking water becomes more clean and safe to drink; and (ii) the water inlet tube (22) and the discharging portion (24) on the valve base (20) are formed as one piece, so the number of components of the faucet is reduced to be more competitive in the market.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A drinking water faucet having an air gap to discharge waste water comprising: a main body, a valve base, a water control unit, a connecting tube and a securing nut, wherein a receiving space that is through and downward is formed inside the main body, and a trough room is connected at a front portion of the receiving space, upper portion of which has a water outlet tube, and an air hole of the receiving space is disposed at one side at lower portion of the trough room;

wherein a water outlet hole and a water inlet tube are located at upper and lower portions of the valve base respectively, and a water control space and a discharging portion are formed at front portion of the valve base, and a first flow hole and a second flow hole are disposed at upper and lower portions respectively inside the water control space, and the first flow hole and the second flow hole are used to connect the water outlet hole and the water inlet tube, wherein the discharging portion has a waste import section; a waste export section; an n-shaped water tube located at upper portion of the discharging portion to connect the waste import section and waste export section; and a check air hole at upper portion of the waste export section;

wherein the water control unit has a water control valve controlled by a handle, and the handle drives the water control valve to rotate, so that the water control valve controls the water in the water control space of the valve base and control open/close of the first flow hole and the second flow hole;

wherein the connecting tube has an outer water inlet tube, a waste water import tube, and a waste water export tube, which are connected to a fixed plate;

wherein the securing nut has a connecting section used to lock the main body with screw; and wherein the valve base is disposed into the receiving space of the main body, so that the water outlet hole is able to upwardly connect to the water outlet tube, and the water control unit is installed in the trough room of the main body, so that the water control valve is able to fit into the water control space of the valve base to control the flow of the filtered water, wherein the outer water inlet tube of the connecting tube covers the outer portion of the water inlet tube of the valve base, so that the fixed plate is located at bottom portion of the valve base to further connect the waste water import tube and the waste import section, as well as the waste water export tube and the waste export section, and when the securing nut is locked through the connecting section at the bottom of the main body, the connecting tube and the valve base are positioned.

2. The drinking water faucet of claim 1, wherein an upper portion of the main body has a shrinking portion to connect the water outlet tube.

3. The drinking water faucet of claim 1, wherein an upper portion of the main body has a shrinking portion, and an engaging rib is protrudingly formed on top of the shrinking portion of the receiving space, and an engaging slot is located on top of the valve base, wherein the engaging slot and the engaging rib engage with each other when the valve base is inserted into the receiving space of the main body, so that the valve base can be securely positioned in terms of angle.

4. The drinking water faucet of claim 1, wherein a recessed space is formed at the front portion of the valve base and the discharging portion is located in the recessed space.

5. The drinking water faucet of claim 1, wherein the connecting section of the securing nut has outer threads.

6. The drinking water faucet of claim 1, wherein the connecting section of the securing nut has inner threads.

\* \* \* \* \*